United States Patent
Bindana et al.

(10) Patent No.: US 11,055,886 B2
(45) Date of Patent: Jul. 6, 2021

(54) METHODS AND SYSTEMS FOR AUTOMATIC FILLING OF COLORS IN OUTLINE IMAGES AT A MULTI-FUNCTION DEVICE

(71) Applicant: XEROX CORPORATION, Norwalk, CT (US)

(72) Inventors: Srinivasarao Bindana, Kakinada (IN); Sudhagar Subbaian, Coimbatore (IN)

(73) Assignee: XEROX CORPORATION, Norwalk, CT (US)

(*) Notice: Subject to any disclaimer, the term of this patent is extended or adjusted under 35 U.S.C. 154(b) by 0 days.

(21) Appl. No.: 16/383,811

(22) Filed: Apr. 15, 2019

(65) Prior Publication Data
US 2020/0329176 A1  Oct. 15, 2020

(51) Int. Cl.
| | | |
|---|---|---|
| G06T 11/40 | (2006.01) |
| H04N 1/62 | (2006.01) |
| G06T 11/60 | (2006.01) |
| G06T 11/80 | (2006.01) |
| H04N 1/00 | (2006.01) |

(52) U.S. Cl.
CPC .......... *G06T 11/40* (2013.01); *G06T 11/60* (2013.01); *G06T 11/80* (2013.01); *H04N 1/622* (2013.01); *H04N 1/00411* (2013.01); *H04N 2201/0094* (2013.01)

(58) Field of Classification Search
CPC combination set(s) only.
See application file for complete search history.

(56) References Cited

U.S. PATENT DOCUMENTS

2005/0281480 A1* 12/2005 Baldwin ............... G06T 11/001
                                                        382/276
2014/0289663 A1*  9/2014 Zhang ..................... G06F 16/54
                                                        715/771

FOREIGN PATENT DOCUMENTS

| JP | 2012-142757 | * | 7/2012 |
| KR | 2020-0106404 | * | 7/2020 |

OTHER PUBLICATIONS

Guide to Microsoft Paint XP (Year: 2016).*

* cited by examiner

*Primary Examiner* — Barbara D Reinier
(74) *Attorney, Agent, or Firm* — Jones Robb, PLLC

(57) ABSTRACT

There is provided a method for filling at least one color in one or more outline images at a multi-function device. The method includes providing a user interface for displaying a color fill option. Based on receiving a selection of the color fill option, a file including at least one outline image is received by a controller. The at least one outline image includes at least one image field. Then, it is identified by an image processor, if the at least one image field includes at least one color marking. Based on the identification, the at least one image field is automatically filled by the image processor according to the at least one color marking to generate a color filled image.

20 Claims, 20 Drawing Sheets
(9 of 20 Drawing Sheet(s) Filed in Color)

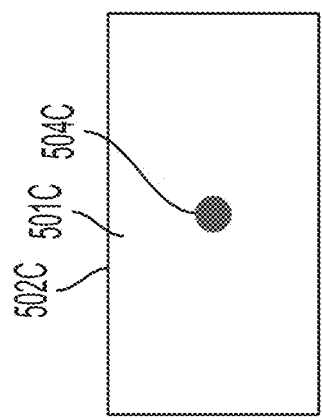
FIG. 5A
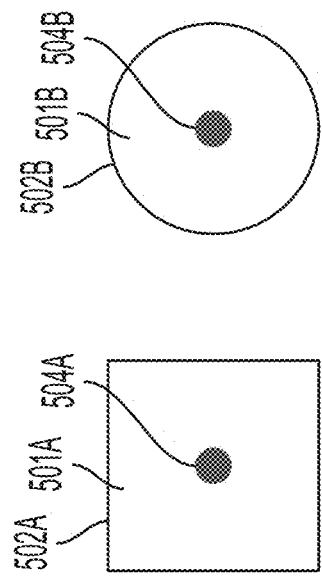
FIG. 5D
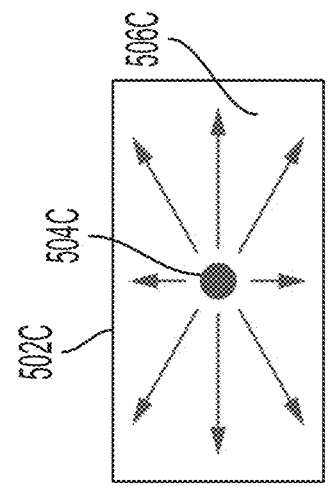
FIG. 5B
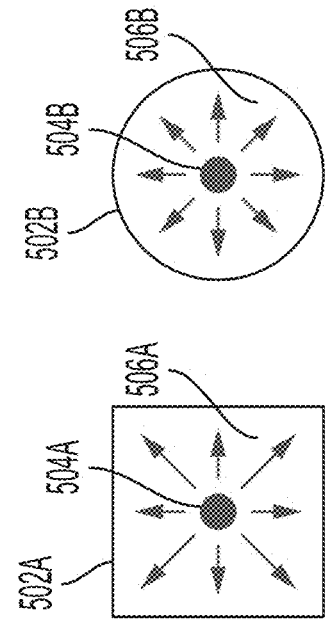
FIG. 5E
FIG. 5C
FIG. 5F

METHODS AND SYSTEMS FOR AUTOMATIC FILLING OF COLORS IN OUTLINE IMAGES AT A MULTI-FUNCTION DEVICE

TECHNICAL FIELD

The presently disclosed subject matter relates to the field of image processing, and more particularly to methods and systems for automatic filling of colors in one or more outline images at a multi-function device.

BACKGROUND

Nowadays people extensively use multi-function device (MFD) for printing, scanning, photocopying, emailing, etc., in their offices and homes. Sometimes users may want to enhance the appearance of a black and white image by filling them with different colors. Currently, the users cannot do this using the multi-function device alone; The sketching or color filling needs to be done either manually or requires a third-party tool or software. This consumes more time, effort and may even involve more money to get tool licenses.

Further, the existing multi-function device or scanning/printing system is not much helpful for cases like interior designing, logo designing, architectural designing, etc. Currently, the multi-function device does not have the capability to fill the colors automatically in outline images based on color reference. Users may not always get the color-sketched images, be it interior design images or logos, etc., as per their color preferences and users may not visualize how the same image would look like with their preferred colors. Therefore, the users may like to get the outline images and fill them with the colors of their choices. But the users have to color fill them either manually or using computer licensed tools. Moreover, if user fills the color manually and finds that image isn't looking good with the selected colors, all the colors, papers, effort and time spent are wasted and the user may have to sketch it again manually. This process repeats until the user finds the correct color combination. Manual coloring also becomes problematic if the user has only single copy of the outline image and wants to enhance the appearance of the images by adding colors. Further, manually shading the images with colors might not be accurate and perfect when scanned; additionally, it consumes more time. Furthermore, changing the existing color of an image manually is also difficult and there are more chances of losing the originality of the image. If the user marks the outline image with various colors to fill and scan in the multi-function device, the scanned output is still outline image marked with colors but not color filled image as output. Hence, considering the above, there is a need for improved techniques for filling color(s) in an outline image(s).

SUMMARY

According to aspects illustrated herein, there is provided a method for filling at least one color in one or more outline images at a multi-function device. The method includes providing a user interface for displaying a color fill option. Based on receiving a selection of the color fill option, a file including at least one outline image is received by a controller. The at least one outline image includes at least one image field. Then, it is identified by an image processor, if the at least one image field includes at least one color marking. Based on the identification, the at least one image field is automatically filled by the image processor according to the at least one color marking to generate a color filled image.

A multi-function device including a user interface, a controller and an image processor is disclosed. The user interface displays a color fill option. The controller receives a file including at least one outline image having at least one image field, based on receiving a selection of the color fill option. The image processor identifies the at least one image field and if the at least image field includes at least one color marking; and based on the identification, automatically fills the at least one image field according to the at least one color marking, to generate a color filled image.

An application for automatically filling one or more colors in an outline image is disclosed. The application runs at a multi-function device for: displaying a color fill option; displaying one or more options to a user for selection of a file, wherein the file includes an outline image having one or more image fields; receiving an option indicating the selection of the file; displaying one or more options for color filling in the one or more image fields of the outline image, the one or more options indicate whether the outline image includes color marking; receiving a selection of an option for color filling; based on the selection, automatically filling the one or more image fields according to the color marking to generate a color filled image; and generating an output file including the color filled image.

A non-transitory computer-readable medium comprising instructions executable by a processing resource to: provide a user interface for displaying a color fill option; based on receiving a selection of the color fill option, receive a file including at least one outline image, wherein the at least one outline image having at least one image field; identify the at least one image field and if the at least one image field includes at least one color marking; and based on the identification, automatically fill the at least one image field according to the at least one color marking, to generate a color filled image.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

The patent or application file contains at least one drawing executed in color. Copies of this patent or patent application publication with color drawing(s) will be provided by the Office upon request and payment of the necessary fee.

FIGS. 5A-5I illustrate various examples of outline images and corresponding color filled images.

DESCRIPTION

Figure 1:
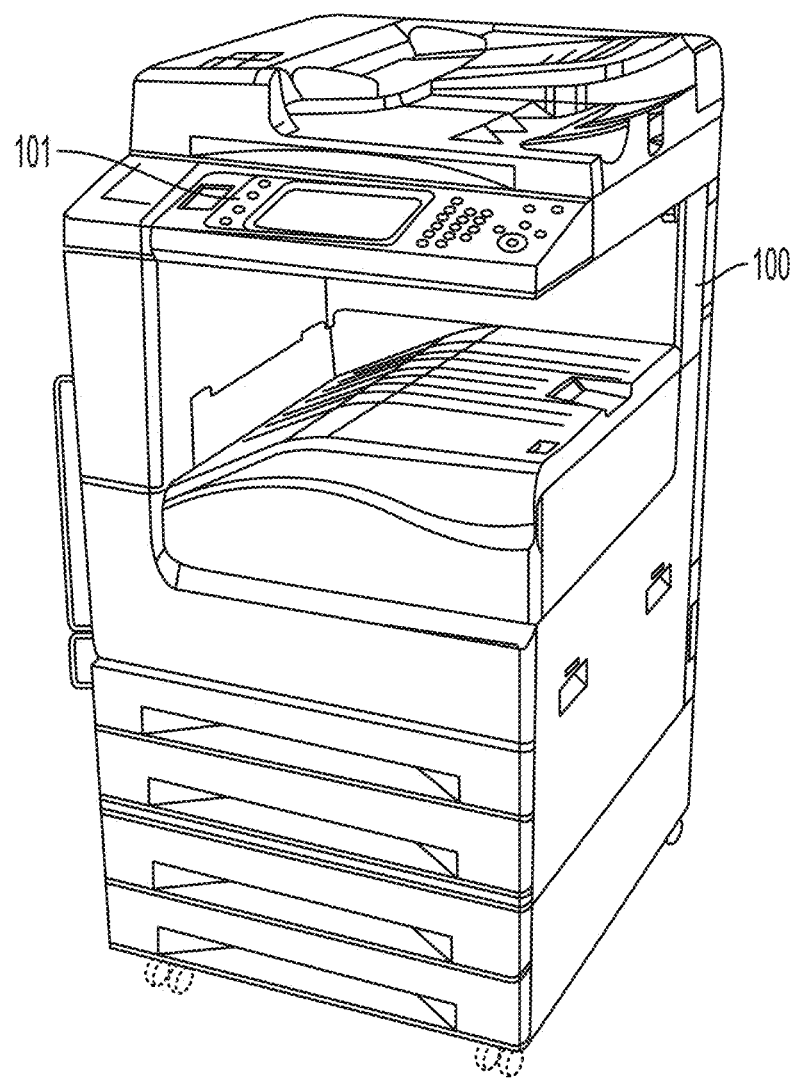
FIG. 1 shows an exemplary physical multi-function device (MFD), in accordance with an embodiment of the present disclosure.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples than just provided below.

As used herein, a "multi-function device" is a single device or a combination of multiple devices, to perform more than one function such as, but not limited to, scanning, printing, cutting, imaging, and so forth. The multi-function device may include software, hardware, firmware, and combination thereof. In the context of the current disclosure, the multi-function device performs automatically color filling in at least one outline image. The multi-function device takes an outline image as an input and outputs a color filled image.

The term "outline image" refers to any image or drawings having edges and does not include any color. The outline image has one or more image fields. The term "image field" refers to an enclosed area of the outline image. The term "filled color image" represents the image (outline image) with filled colors. The term "color marking" refers to a color marked in each image field to be filled in the outline image or each image field of the outline image.

The term "file" refers to any document or file in a virtual or software form (embodied in a software file) or can be in physical form, such as printed on paper. The virtual form can also be referred to as digital form, electronic version or the like. The file includes one or more outline images. The "file" may be submitted in the electronic form or in the physical form to the multi-function device.

As used herein a "user" refers to any user who is registered with the multi-function device and can access one or more services of the multi-function device directly.

An "output medium" refers to a medium on which the at least one color filled image is printed. Non-limiting examples of the output medium includes a paper, an envelope, a fabric, a plastic.

Overview

To overcome the difficulties related to color filling and to automate the task of color filling, the present disclosure is provided. A feature is implemented in a multi-function device to fill colors in an outline image and to edit/change the colors as per user's choice. To enable this, the disclosure proposes to have an option in the multi-function device to provide the capability to automate the task of color fill in an outline image according to color marking. The color marking in outline image fields can be provided either directly at the multi-function device or through manual color marking in a printed copy of the outline image. The multi-function device then analyses the color marked outline image to find the various colors and colors locations in the image fields and fills the analyzed colors in the image fields. In this manner, the color is filled in the outline image at the multi-function device without or with minimal user intervention.

Exemplary Physical Multi-Function Device

FIG. 1 shows an exemplary physical multi-function device (MFD) 100, in accordance with an embodiment of the present disclosure. The multi-function device 100 may be used by a number of users for one or more services such as print, email, scan, workflows, copy, fax, or the like. The multi-function device 100 may be a single device or a combination of multiple devices to perform more than one function such as, but not limited to, printing, scanning, emailing, imaging, photocopying, and so forth. The multi-function device 100 may include software, hardware, firmware, and combination thereof. As depicted, the multi-function device 100 is a standalone device but the multi-function device 100 may be a part of a network.

In context of the present disclosure, the multi-function device 100 automates the task of color filling in an outline image. The outline image is included in a file that is provided to the multi-function device 100. The file includes one or more outline images that are to be filled. The file can be provided to the multi-function device 100 through various ways. For example, the file can be obtained after scanning. In another example, the file can be obtained through a USB of the user. In further example, the file can be obtained from a network folder. In a further example, the file can be obtained from the Internet. For instance, the file may be downloaded from a website. In another instance, the file may be present in an email of the user and may be downloaded from his email box. In a furthermore example, the file can be obtained from a memory of the multi-function device 100. These are few examples; there can be other possible ways to obtain and submit the file to the multi-function device 100.

The file includes one or more outline images, but the disclosure is explained considering a single outline image without limiting the scope of disclosure. The outline image has one or more image fields (refer to FIGS. 5A, 5B, 5C, 6A and 7A). Each image field includes at least one color marking. Each image field may have a different color marking or may have the same color marking. For example, one image field may have a red color marking, but the other image field may be marked as green. For each image field, the color marking can be provided in any desired format such as a simple circular mark (FIGS. 5A-5F) or the like. The color marking can be done manually by the user or can be done automatically and directly at the multi-function device 100 through a user interface 101 of the multi-function device 100. For example, the user performs color marking of the outline image using a pen marker, where each image field is marked using a color of his choice or as required. In other example, a preview of the outline image along with a color panel is shown to the user via the user interface 101 of the multi-function device 100. The user can provide his color choice through the color panel displayed via the user interface 101 of the multi-function device 100. The user selects the color for each image field. In this manner, the multi-function device 100 receives the file having the outline image with color marking. The outline image with color marking is an input provided to the multi-function device 100. The multi-function device 100 performs image processing and provides an output. The output is an output file having a color filled image. The output can be stored at the multi-function device 100. The output can be printed at the multi-function device 100. The output can be sent to the user at his email address. The output can be saved in a job storage system. The output can be saved to a public mail box device. The output can be saved to a network folder. The output can be saved to USB. The output can be saved to a repository. These are few examples, but the output can be saved in any known or later developed devices or systems.

In operation, the multi-function device 100 receives at least one outline image. The multi-function device 100 checks or identifies if the at least one outline image includes at least one color marking. Based on the identification, the multi-function device 100 analyzes the at least one color marking and identifies one or more image fields of the at least one outline image. Then, the multi-function device 100 automatically fills color in the one or more image fields of the at least one outline image based on the at least one color marking. The color filled image is generated and finally, the color filled image is displayed to the user.

In case, the user does not like the color filled image, then the user may undo the color filling and the multi-function device 100 converts the color filled image back to the original outline image and displays the outline image again through the user interface 101. The multi-function device 100 may receive a new color marking from the user via the user interface 101 of the multi-function device 100. The multi-function device 100 again fills a color in each of the one or more fields of the outline image. The process is repeated until the user gets a desired color filled image and submits his confirmation for the color filled image.

A lot of human effort and time is saved as the multi-function device 100 performs the task of color filling based on the at least one color marking. For example, the effort required for color filling or editing is saved. In scenarios where the user does not like the color filled image, the user does not have to sketch the outline image again manually as the same can be retrieved from the memory or can be easily created (by removing the filled colors) by the multi-function device 100. As a result, problem of having a single copy of the outline image is solved.

Exemplary System Components

Figure 2:
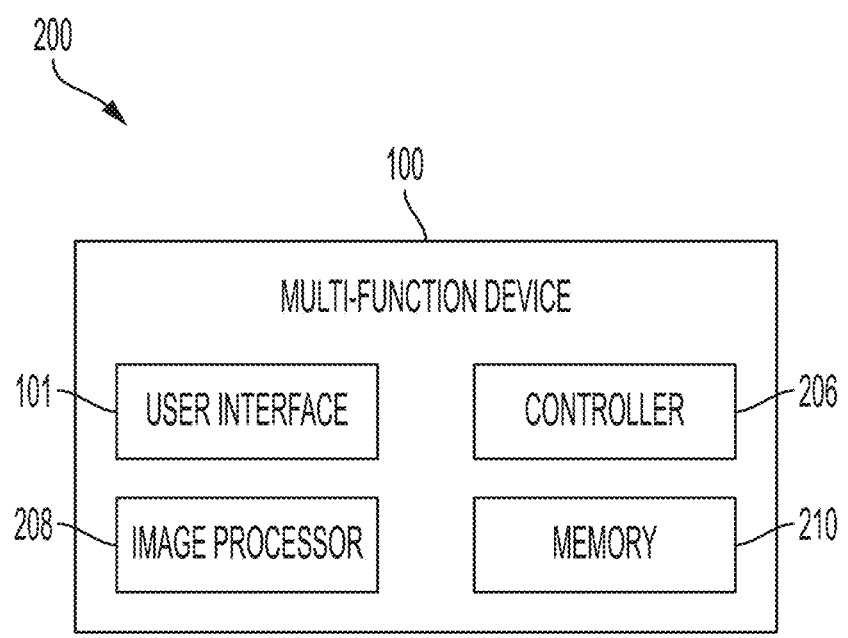
FIG. 2 is a block diagram illustrating various system components of an exemplary multi-function device, in accordance with an embodiment of the present disclosure.

FIG. 2 is a block diagram 200 illustrating various system components of an exemplary multi-function device 100, in accordance with an embodiment of the present disclosure. As shown, the multi-function device (MFD) 100 includes a user interface 101, a controller 206, an image processor 208, and a memory 210. Each of the components 101, 206-210 is connected to each other via a conventional bus or a later developed protocol. Further, each of the components 206-210 communicates with each other for performing various functions of the present disclosure.

The multi-function device 100 enables the user to fill color in the outline image(s) without a need of an external tool, a software, an external input device or computing device like a computer.

For accessing the multi-function device 100, the user enters login credentials using the user interface 101. The login credentials may include biometrics of the user like a finger scan, thumb scan, face scan, etc., a card scan, a code scan, and so forth. The user interface 101 displays a color fill option to the user. The user selects the color fill option displayed on the user interface 101 for filling color in one or more outline images in a file.

Based on receiving a selection of the color fill option, the controller 206 displays a plurality of file options to be selected by the user. The plurality of file options are options through which the user can select the file or upload the file including the at least one outline image. The plurality of file options may include a scan option, an external storage device or a USB option, a network folder option, a web option, a printer memory option, and so forth. The user can upload an electronic format of the file directly by selecting one of the options: external storage device or a USB option, the network folder option, the web option, and the memory option. In some embodiments, the user selects the scan option to scan a printed version of the file. Based on the selection, the controller 206 receives the file including the at least one outline image via the user interface 101. For easy discussion, a single outline image is considered.

The received file with the outline image is passed to the image processor 208 for further processing. The image processor 208 identifies if the outline image includes at least one color marking. Particularly, the image processor 208 identifies if each image field of the outline image includes the at least one color marking. The at least color marking can be identified through morphological operation, but other operations can be implemented. In case the image processor 208 identifies that the outline image includes the at least one color marking, the image processor 208 proceeds with further analysis. The image processor 208 analyzes the at least one color marking to identify color marked in each image field and various color locations in each image field. Upon identification of the color and color locations for each image field, the image processor 208 fills each image field based on the identified color. As a result, the image processor 208 generates a color filled image. The image processor 208 then outputs the file with the color filled image.

In case the image processor 208 identifies that the outline image does not include the at least one color marking, the image processor 208 communicates with the controller 206. The controller 206 requests the user to provide the at least one color marking for each image field of the outline image. The user can provide the at least one color marking for the outline image directly at the multi-function device 100 or can provide using pen marker. In the first case, the controller 206 displays a color panel and a preview of the outline image for the at least one color marking. The user then provides the color marking for each image field. In the second case, the controller 206 prints the outline image for the user. The user then marks each image field with a specific color he wishes to have for the image field. The user then submits the printed version of the outline image to the multi-function device 100 for processing. The controller 206 then receives the printed version of the outline image with the color marking. The controller 206 scans the printed version of the outline image for further processing. The controller 206 submits the scanned outline image with the color marking to the image processor 208 for further processing. The image processor 208 processes the scanned outline image as discussed above. For example, the image processor 208 identifies each image field, color marking in each image field, various color locations in each image field and fills each image fields to generate a color filled image. In this way, the color marking is provided when the outline image does not have the color marking.

The image processor 208 communicates with the controller 206 upon completion of the task of automatic color filling of the outline image and provides the color filled image to the controller 206. The controller 206 then displays a preview of the color filled image through the user interface 101 of the multi-function device 100 for user confirmation. Displaying a preview of the color filled image helps the user visualize how the same image appears with their preferred colors. The user can check the color filled image, particularly, the user checks whether the outline image includes colors based on the color marking. If yes, the user provides his confirmation through the user interface 101. Otherwise, the user can edit the color filled image. In such cases, the controller 206 sends the user response to the image processor 208. The image processor 208 edits the color filled image. The image processor 208 then removes the color from the color filled image and converts back into the outline image. Alternatively, the image processor 208 deletes the color filled image and retrieves the outline image from the memory 210 of the multi-function device 100. The image processor 208 communicates with the controller 206. The controller 206 again displays the outline image to the user through the user interface 101 for new color marking. The user submits or provides color marking for each image field again as mentioned above. Upon receiving the new color marking, the controller 206 communicates with the image processor 208. The image processor 208 then auto fills each image field again according to the color new marking provided by the user. The same procedure is discussed above in detail.

Finally, the color filled image is provided and displayed through the user interface 101 of the multi-function device 100.

In this manner, the multi-function device 100 outputs a color filled image according to the color marking without requiring any additional or third-party tool. Moreover, the multi-function device 100 allows the user to edit the outline image in simple and efficient manner without losing on the original outline image.

Once the color filled image is confirmed by the user, the controller 206 stores the color filled image in the memory 210 of the multi-function device 100. The controller 206 sends the color filled image to a print engine (although not shown) for printing. The controller 206 can send the color filled image to user at his email address. For this, the controller 206 displays the user interface 101 requesting the user to provide his email address. The controller 206 can save the color filled image to a job storage system. The controller 206 can save the color filled image to a device public mail box. The controller 206 can save the color filled image to a network folder. The controller 206 can save the color filled image to USB. The controller 206 can save the color filled image to a repository such as a repository over the cloud or a shared repository. The controller 206 displays several options to the user to save or print the color filled image (refer to FIG. 4H).

The memory 210 stores the outline image for later retrieval and/or processing. The memory 210 may store the color filled image based on input from the user. Further, the memory 210 may store user credentials such as user name, password, etc.

Exemplary Method

Figure 3A:
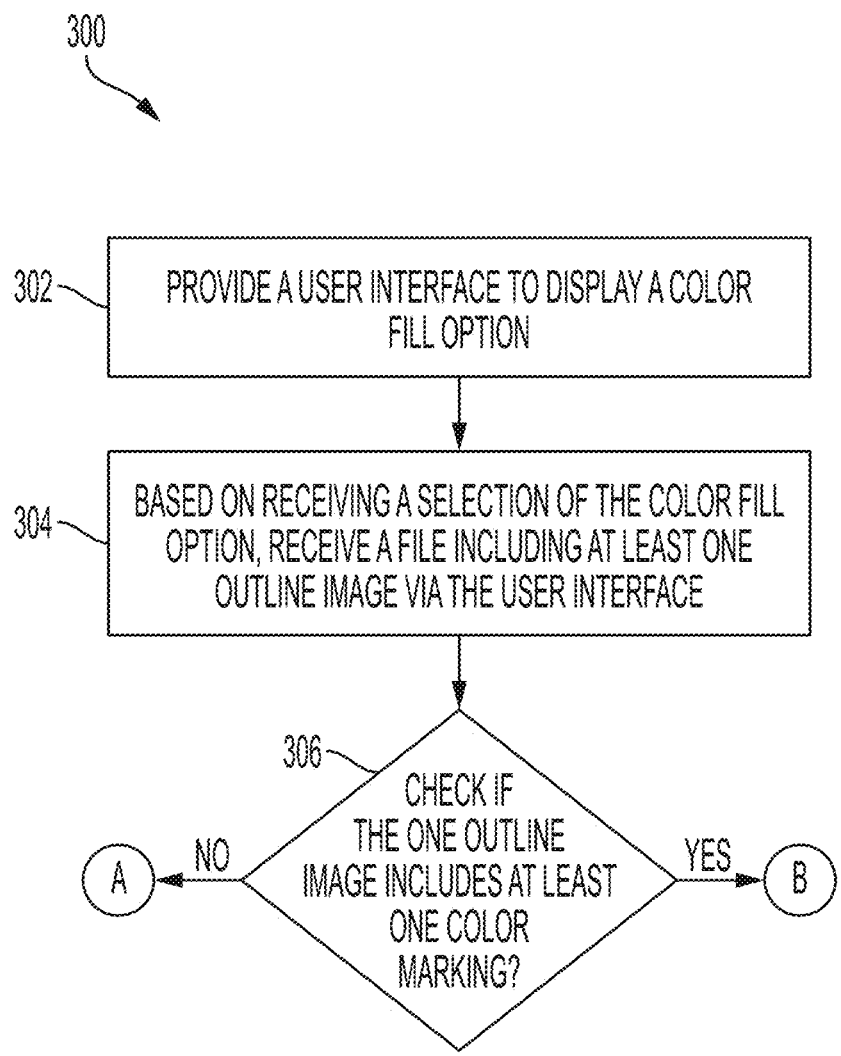
FIGS. 3A-3B represent a flowchart illustrating an exemplary method for automatically filling color in at least one outline image at the multi-function device of FIG. 1, in accordance with an embodiment of the present disclosure.
Figure 3B:
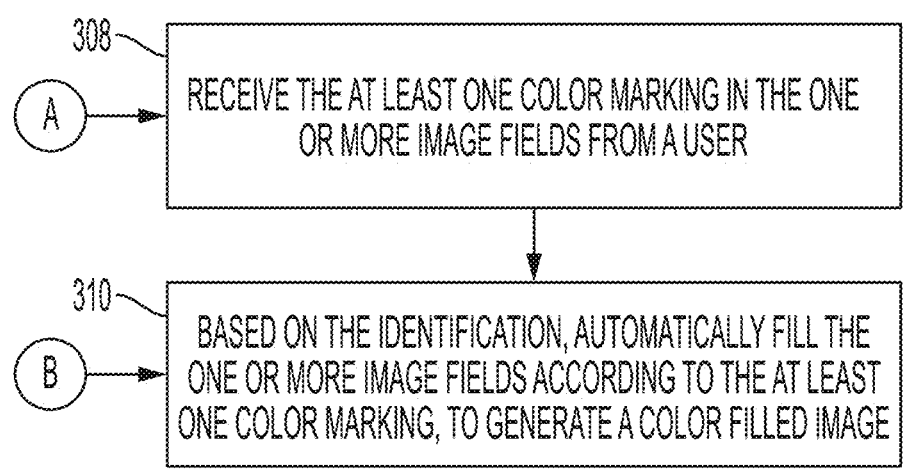

FIGS. 3A-3B represent a flowchart illustrating an exemplary method 300 for automatically filling color in at least one outline image at the multi-function device 100 of FIG. 1, in accordance with an embodiment of the present disclosure. As discussed with reference to FIG. 1, the user accesses the multi-function device 100 for filling color in an outline image.

The method 300 starts at block 302 where the multi-function device 100 provides a user interface, for example, the user interface 101 to display a color fill option. The user selects the color fill option. The color fill option allows the user to fill one or more colors in the at least one outline image. Upon selecting the color fill option or based on receiving a selection of the color fill option, at 304 a file including the at least one outline image is received. The file may have multiple outline images but for the sake of discussion, a single outline image is considered. The file includes one outline image. The outline image includes one or more image fields. An image field represents an enclosed area of the outline image. In other words, the one or more fields being one or more segmented parts of the outline image. For example, if the outline image includes a Rubik cube, then a plurality of squares of the Rubik cube may be considered as one or more image fields (refer to FIG. 6A).

The file can be received in electronic format through one or more ways as discussed above. The file can be received in a printed version form. The printed version of the file is then scanned at the multi-function device 100 and converted into the electronic form. In this manner, the user provides the file selection through the user interface.

At block 306, it is checked or identified whether the outline image includes at least one color marking. The at least one color marking is identified based on morphological method. But the at least one color marking can be identified using other known or later developed methods. If the outline image does not include the at least one color marking, then method proceeds to block 308, else the method proceeds to block 310. The image processor 208 may implement the block 306.

While checking the at least one color marking, the image fields are also identified. For example, if the method identifies five color markings, this indicates the outline image has five image fields to be filled. The method further includes analyzing the color marked outline image to identify colors and color locations in the image fields.

In case the outline image does not include the at least one color marking, the proceeds to block 308. At block 308, the at least one color marking is received from the user. The user can provide the at least one color marking directly at the multi-function device or can submit a printed version of the outline image. In the former case, a preview of the outline image along with a palette or color panel is displayed through the user interface of the multi-function device. The color panel includes a plurality of colors to be selected from the user. The selection of the colors is considered as the at least one color marking from the user. The user selects the color for each image field. In other cases, the user has a printed version of the outline image and the user marks the outline image using his pen marker or other suitable ways. Here, the user provides the at least one color marking for the outline image. The user then submits the printed form of the color marked outline image or file having the color marked outline image. The printed version is then scanned at the multi-function device to generate an electronic form of the outline image. The outline image is then analyzed by the multi-function device for the at least one color marking. In this manner, the at least one color marking is checked.

In some implementations, the method directly provides one or more options to the user for the at least one color marking. Examples of the options include an "auto fill" option or a "manual fill" option. The user selects one of the displayed options. The user can select the "auto fill" option if the outline image already includes the at least one color marking. The multi-function device then analyzes the at least one color marking to identify one or more fields of the outline image and automatically fills a color in the one or more fields based on the at least one color marking.

The user can select the "manual option," if the outline image does not include the at least one color marking. In such cases, the user manually provides the at least one color marking in the outline image. The user can provide the at least one color marking directly at the multi-function device or can provide manually using pen marker as discussed above.

Upon receiving the at least one color marking, the outline image is analyzed to identify the color and color locations in the image fields.

At block 310, the image fields are automatically filled according to the at least one color marking to generate a color filled image. After generating the color filled image, a preview of the color filled image is displayed to the user through the user interface for user confirmation. If the user confirms that the color filled image is as desired, the method proceeds with generating an output file having the color filled image. Otherwise, the user can edit the color filled image. In such cases the method includes converting the color filled image back to the outline image by automatically removing the colors from the outline image. In some implementations, the method deletes the color filled image and retrieves the stored outline image from the memory and presents the outline image to the user for new color marking. Then, the user provides at least one new color marking for the outline image and the method blocks are repeated till the user gets the desired color filled image.

For example, if the user is not satisfied with the color filled image, the user may undo the color filling and change the color filled image back to the original outline image, and again provides a new color marking. The multi-function device fills the color in the original outline image based on the new color marking. In some implementations, the user is allowed to change color of some of the one or more fields of the outline image(s). This process may repeat until the user gets an output color filled image of his/her choice. The user finalizes the color filled image.

Once the user is satisfied with the color filled image, an output file is generated including the color filled image. Finally, the output file including the color filled image is printed, sent to the user through electronic email, stored in a USB, stored in other devices and so on. More details are discussed above.

The method includes converting the outline image into a binary image and then converting the binary image into a segmented image. And the method blocks as discussed above are implemented on the segmented image.

In this way, the method 300 automatically fills one or more colors in the outline image.

Exemplary Outline Images and Color Filled Images

Figure 4A:
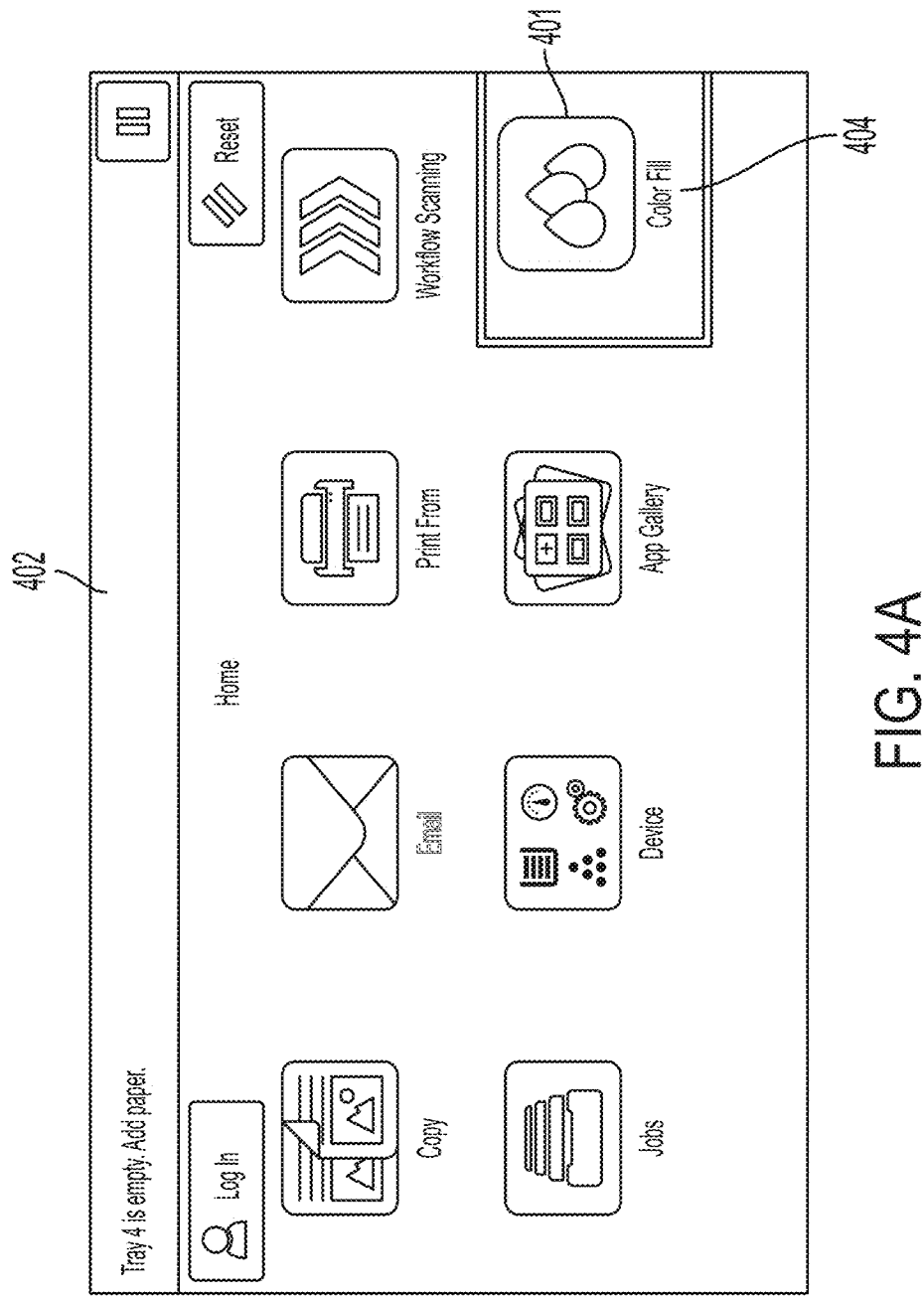
FIGS. 4A-4H show various screenshots for filling color(s) in at least one outline image at the multi-function device of FIG. 1, in accordance with an embodiment of the present disclosure.

FIGS. 4A-4H show various screenshots of an application for filling color in at least one outline image at the multi-function device 100 of FIG. 1, in accordance with an embodiment of the present disclosure. The application runs at the multi-function device to automatically fill one or more colors in an outline image. The application for example is a color fill application 401, as shown in FIG. 4A. The application 401 displays several user interfaces 412, 422, 432, 442, 452, 462 and 472 as shown in FIGS. 4B, 4C, 4D, 4E, 4F, 4G, and 4H. Each user interface 412-472 will be discussed in detail below.

In execution, the application is a color fill application, marked as 401 as shown in the user interface 402 of FIG. 4A. The application 401 displays a color fill option 404. The user selects the color fill option 404. Upon selection of the option 404, the application 401 displays one or more options 406A, 406B, 406C, 406D, and 406E to a user for selection of a file. The file includes an outline image having one or more image fields. The options 406A, 406B, 406C, 406D, and 406E are shown through the user interface 412 (see FIG. 4B). The user can select any of the displayed options 406A, 406B, 406C, 406D, and 406E for selecting the file. The option 406A indicates the selection of the file through scan option. In the option 406A, the user provides a printed version of the file, which is then scanned at the multi-function device 100. In the 406B option, the user selects the file through USB. The user selects the USB file option 406B to browse files from external connected devices. In the 406C option, the user selects the file through a network folder. The user selects the network folder option 406C option to browse the source files from the computer, which are connected in same LAN or network as the multi-function device. In the 406D, the user selects the file through web. The user selects the web file option 406D to browse one or more files from the Internet, email, cloud, etc. In the 406E option, the user selects the file through a memory of the multi-function device.

Figure 4B:
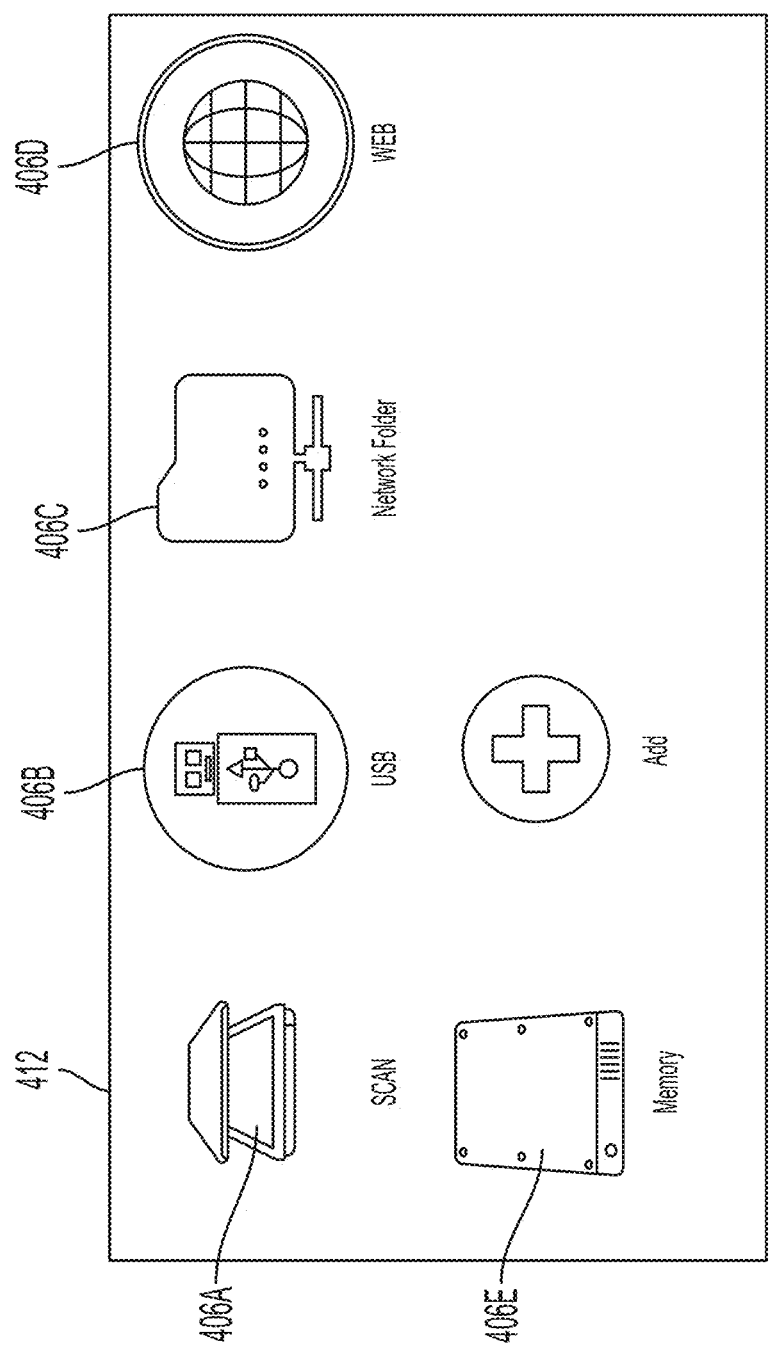
Figure 4C:
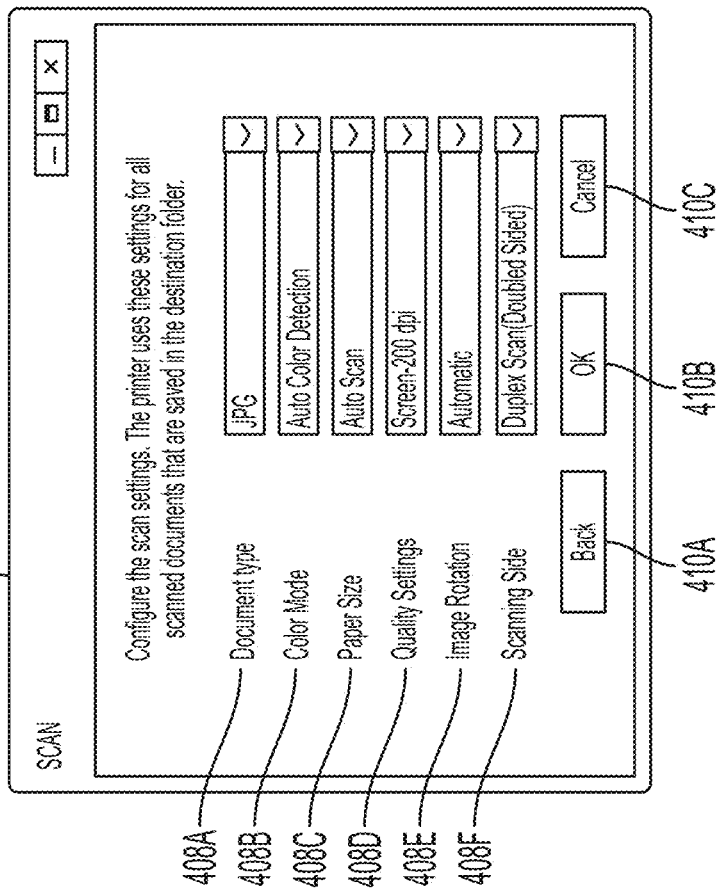

Continuing with the option 406A, when the user selects the scan input file option for the file, a screenshot of the user interface 422 is shown in FIG. 4C. The user interface 422 displays one or more scan properties 408A-408F. Examples of the scan properties may include, but are not limited to, a document type 408A, a color mode 408B, a paper size 408C, quality settings 408D, image rotation 408E, a scanning side 408F, along with back option 410A, an OK option 410B, and a cancel option 410C. The user selects a value in one or more of the scan properties and selects at least one of the options 410A-410C to proceed further.

Figure 4D:
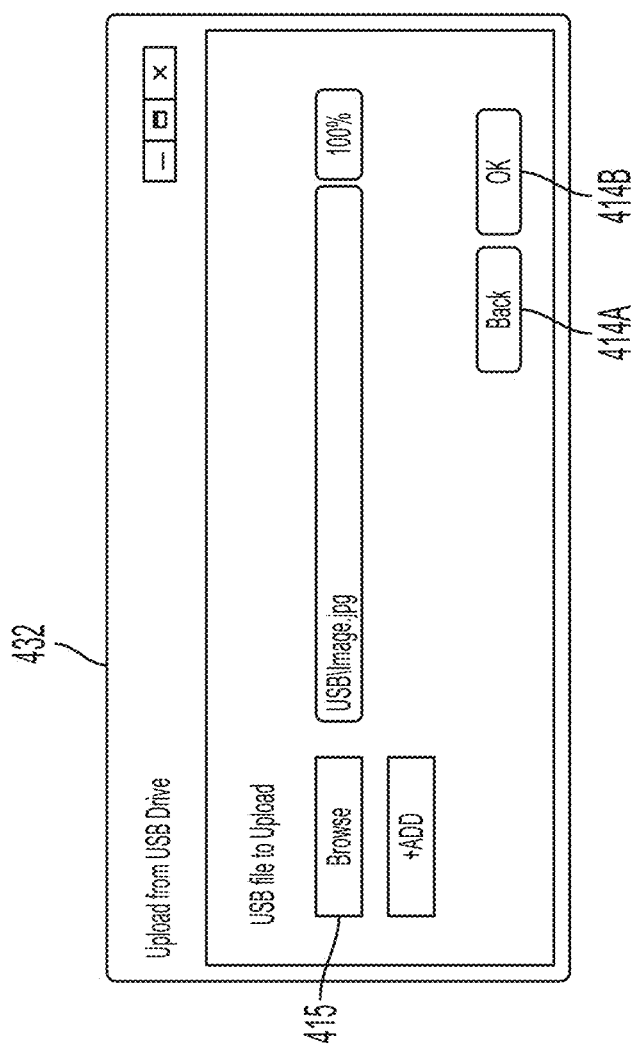

Looping back to the user interface 412 of FIG. 4B, if the user selects the option 406B, then a user interface 432 is shown in the screenshot 400D (See FIG. 4D). The user interface 432 prompts the user to browse to a file location via a browse option 415. After providing a file location via the browse option 415, the user selects an OK option 414B. If the user wants to go back to previous screen or user interface, then the user selects a back option 414A.

Figure 4E:
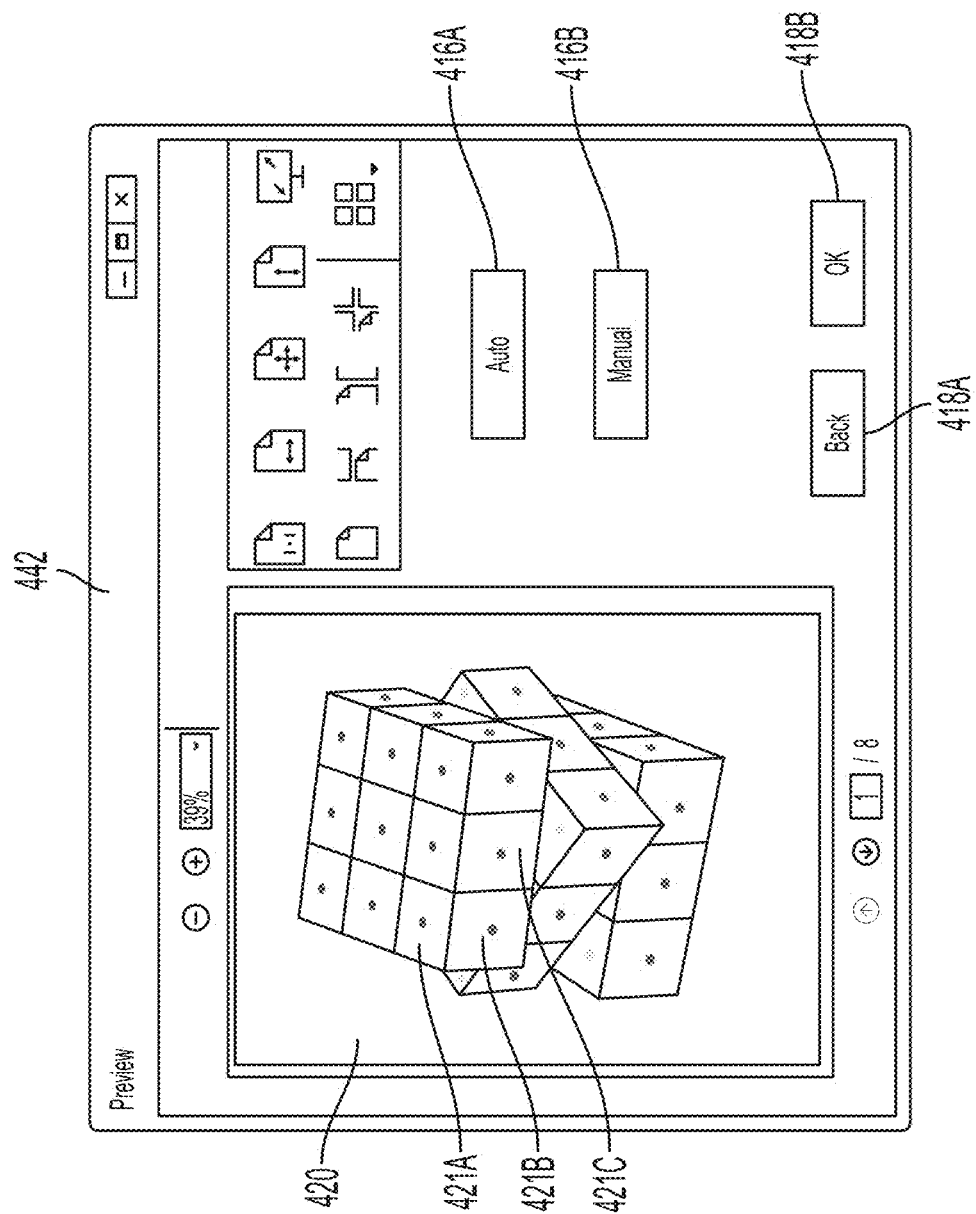
Figure 4F:
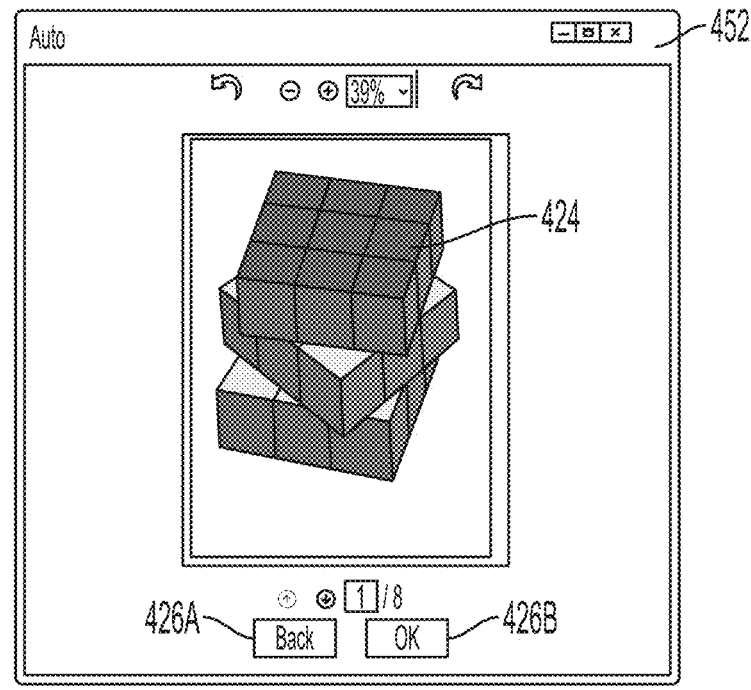

In this manner, the application 401 receives an option indicating the selection of the file. The application 401 displays one or more options for color filling in the one or more image fields of the outline image, the one or more options indicate whether the outline image includes color marking. The options are shown in FIG. 4E as "auto" 416A and "manual" 416B. The user interface 442 includes back 418A and OK 418B options to proceed as required. The user can select any of the options 416A "auto" and "manual" 416B. The user can select any option based on whether the file is already color marked or not. The user can find this by looking in file preview in the user interface 442. The application 401 display a preview 420 of the outline image as indicated in the user interface 442 of FIG. 4E. The at least one outline image 420 includes one or more fields marked as 421A, 421B and 421C. The user selects the option "auto" 416A when the outline image or the image fields includes the color marking. The application 401 receives a selection of the option for color marking. Based on the selection, the application 401 automatically fills the one or more image fields according to the color marking to generate a color filled image. The color filled image 424 is shown in the user interface 452 of FIG. 4F. The color filled image 424 is immediately displayed to the user as soon as the user selects the auto option, this way the user can see the color filled image 424 as shown in the user interface 452 and may save or send it if the user is satisfied with the color filled image 424. The user confirms the color filled image by selecting an ok option 426B when the user is satisfied with the color filled image. Otherwise, the user selects a back option 426A to recolor the outline image 420. The application 401 generates an output file including the color filled image.

Figure 4G:
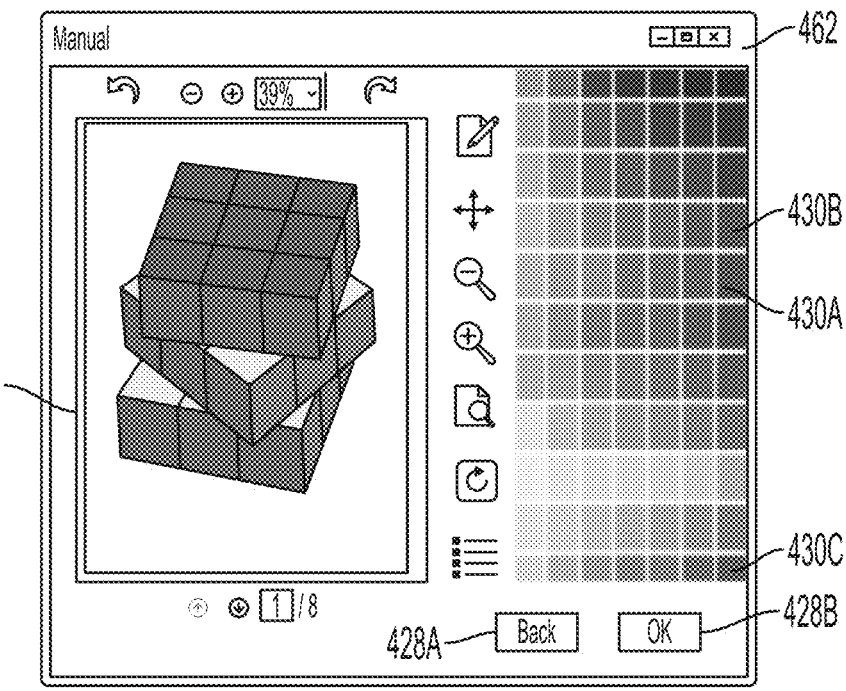

Looping back, the user selects the option "manual" 416B when the outline image or the image field does not include color marking and the user requires to manually provide the color marking. When the user selects manual option 416B, a user interface 462 opens as shown in FIG. 4G. The user interface 462 allows the user to mark the colors on the outline image of the file. The user interface 462 displays a palette including a plurality of colors such as 430A, 430B, 430C and so on. The user places a color on a field of the outline image where that selected color needs to be filled. This way the user can mark all the required colors in the image fields of the outline image. The user provides a color marking by selecting one or more colors from the plurality of colors 430. After providing the color marking for each of the one or more fields, the user selects the ok option 428B. The application 401 color fills the outline image 420 according to the color marking provided via the plurality of colors 430A, 430B, 430C and so on to create a color filled image 434. The user can select a back option 428A when the user is not happy with the color filled image 434 and may want to provide a new color marking.

Figure 4H:
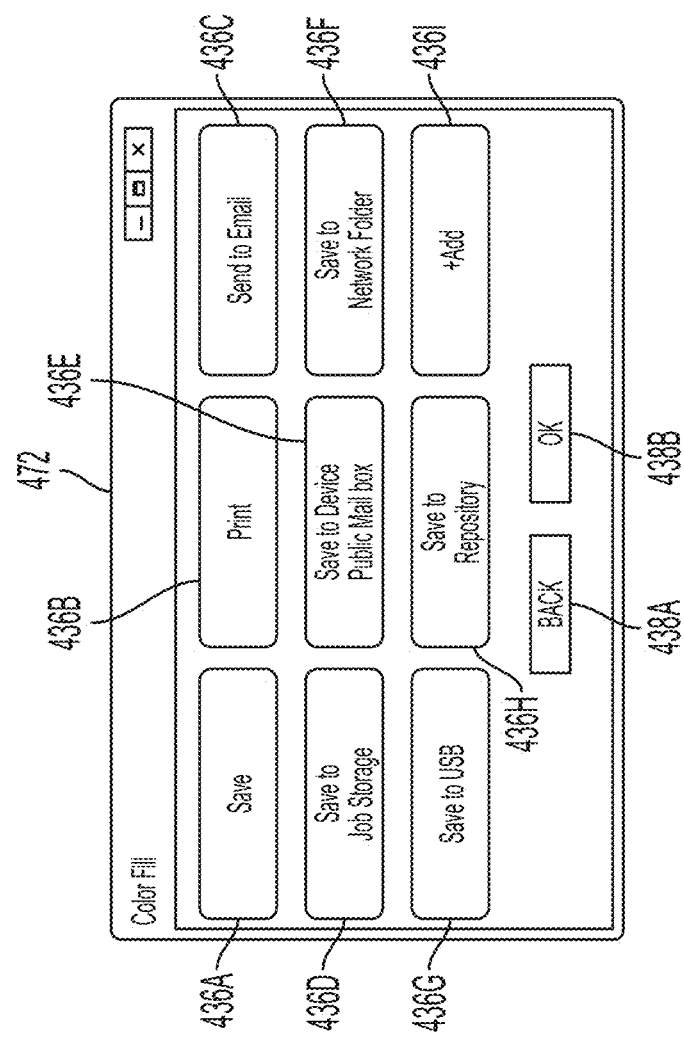

Once the user finalizes the color filled image 434 (or 424 for the auto option scenario), the application 401 displays one or more options 436A-436H through the user interface 472 as shown in FIG. 4H. The output file including the color filled image can be either saved or printed. The options 436A-436H include a save option 436A, a print option 436B, a send to email option 436C, a save to job storage option 436D, a save to device public mail box option 436E, a save to network device option 436F, a save to USB (or an external storage) option 436G, and a save to a repository 436H. The user may add more options by selecting an add option 436I. The save option 436A allows the user to save the color filled image 434 (or 424) in the memory of the multi-function device. The print option 436B allows the user to print the color filled image 434 (or 424). The send to email option 436C allows the user to send the color filled image 434 (or 424) in an email to at least one email address. The save to job storage option 436D allows the user to save the color filled image 434 (or 424) in a job storage. Further, the save to device public mail box option 436E allows the user to save the color filled image 434 (or 424) in a public mail box of the device, i.e., the multi-function device. Further, the save to network folder option 436F allows the user to save the color filled image 434 (or 524) in a network folder. Furthermore, the save to repository option 436H allows the user to save the color filled image 434 (or 524) in a repository such as a cloud-based repository. After selecting one of the options 436A-436H, the user selects an ok option 438B. In case, the user wants to make any changes and wants to go back to previous user interface, the user selects a back option 438A.

Figure 5G:
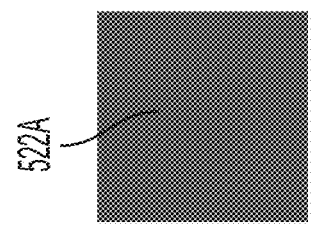
Figure 5H:
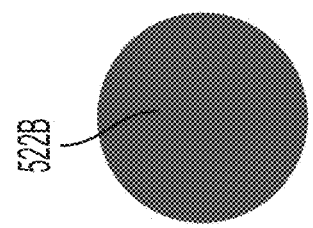
Figure 5I:
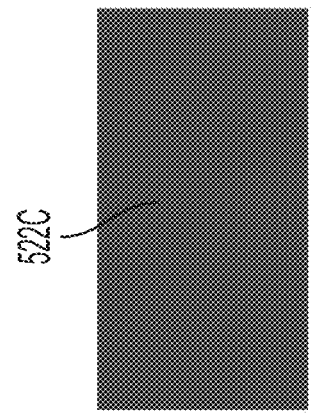

FIGS. 5A-5I illustrate various examples of outline images and corresponding color filled images. FIGS. 5A, 5B and 5C show three outline images as 502A, 502B and 502C. The outline image 502A indicates a square, 502B indicates a circle and 502C indicates a rectangle. Each outline image has one image field, i.e., an enclosed area. For example, the outline image 502A has 501A as the image field., the outline image 502B has 501B as the image field and 502C has 501C as the image field. The outline images 502A, 502B and 502C further include color markings as 504A, 504B and 504C, respectively. The color markings 504A, 504B and 504C are spread in all directions to fill the outline images 502A, 502B and 502C. The direction is shown by an arrow such as 506A for the outline image 502A, the direction is shown by 506B for the image 502B and 506C for the image 502C. For example, the blue color 504A is spread in the image field 501A of the outline image 502A (shown in FIG. 5D), pink color is spread in the image field 501B of the outline image 502B (shown in FIG. 5E), and red color is spread in the image field 501C of the outline image 502C (shown in FIG. 5F). Once the multi-function device fills the color in the outline images 502A, 502B and 502C, color filled images are generated as shown in FIGS. 5G, 5H and 5I. FIG. 5G indicates the color filled image 522A corresponding to the outline image 502A of FIG. 5A. FIG. 5H shows the color filled image 522B corresponding to the outline image 502B of FIG. 5B and FIG. 5I illustrates a color filled image 522C corresponding to the outline image 502C of FIG. 5C.

FIGS. 6A-6D illustrate an outline image, intermediate images and color filled image.

Figure 6B:
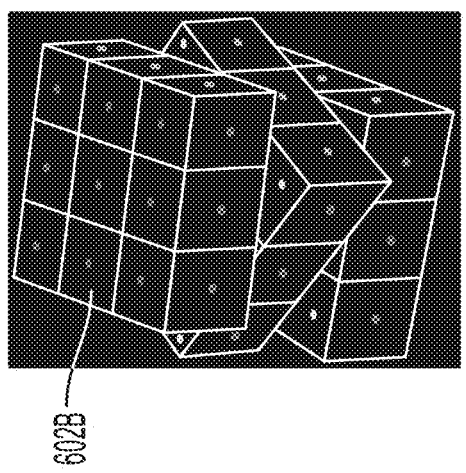
FIGS. 6A-6D illustrate an outline image, intermediate images and color filled image.
Figure 6D:
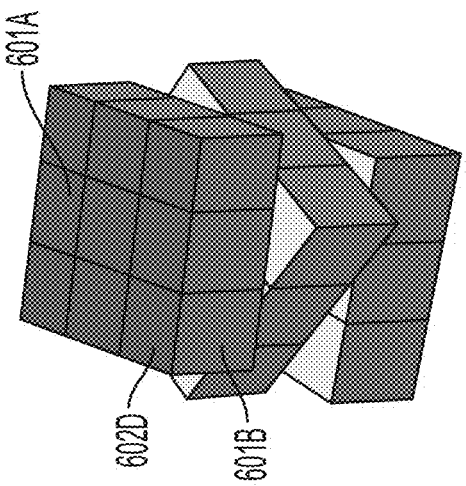
Figure 6A:
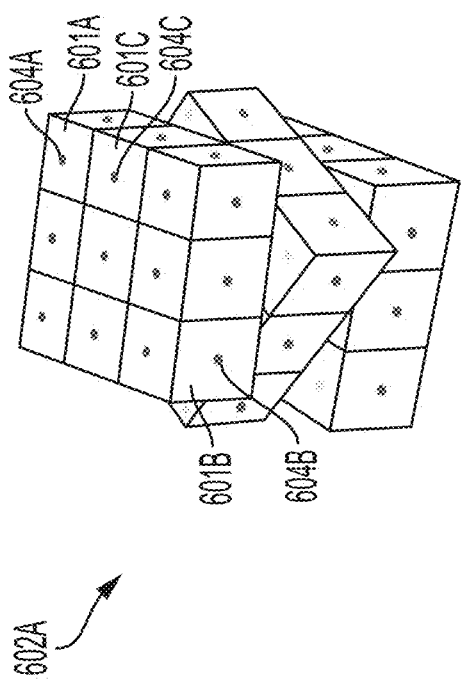
Figure 6C:
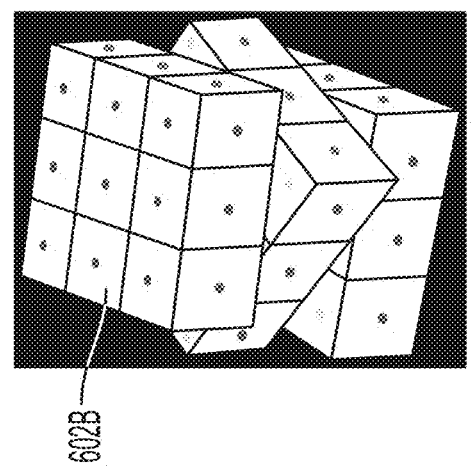

FIG. 6A illustrates an outline image 602A having a plurality of image fields marked as 601A, 601B, 601C and so on. Each image field such as 601A, 601B and 601C includes color marking such as 604A, 604B and 604C, respectively. For example, the image field 601A includes the blue color marking 604A and the image field 601B includes the red color marking as 604B. For illustration purpose, only three image fields 601A, 601B and 601C are referred but as clearly seen in FIG. 6A, the outline image 602A has more image fields and corresponding color markings. Moreover, the number of image fields correspond to the number of color markings. For example, if the multi-function device finds five color markings, then the outline image may have five image fields. Each image field may be marked with same color or may be different color. As an example, the image fields 601A and 601B have different color markings as blue 604A and red 604B, respectively. In another example, the image fields 601A and 601C have same color markings as 604A and 604C, i.e., red.

The outline image 602A is then processed. During the image processing, a binary image 602B is generated from the outline image 602A, as shown in FIG. 6B. The binary image 602B is then converted into a segmented image 602C, indicated in FIG. 6C. Finally, a color filled image 602D is generated as shown in FIG. 6D. The color filled image 602D includes color according to the color markings as initially shown in FIG. 6A. As an example, the image field 601B is filled with red color while the image field 601A is filled with blue color.

Figure 7B:
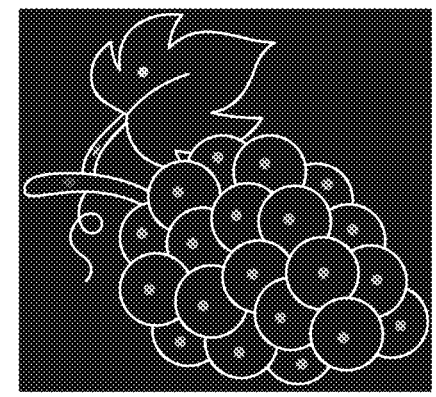
FIGS. 7A-7D illustrate an outline image, intermediate images and color filled image.
Figure 7D:
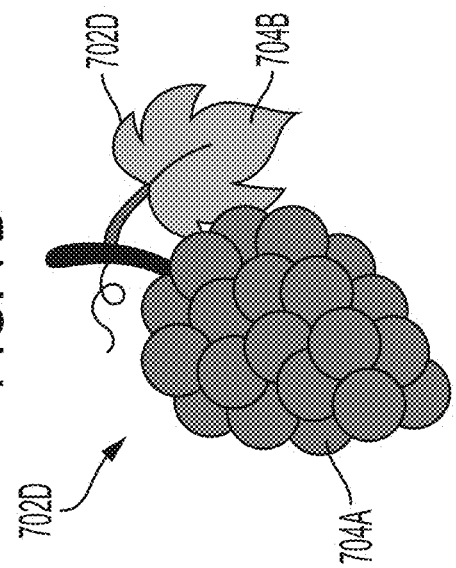
Figure 7A:
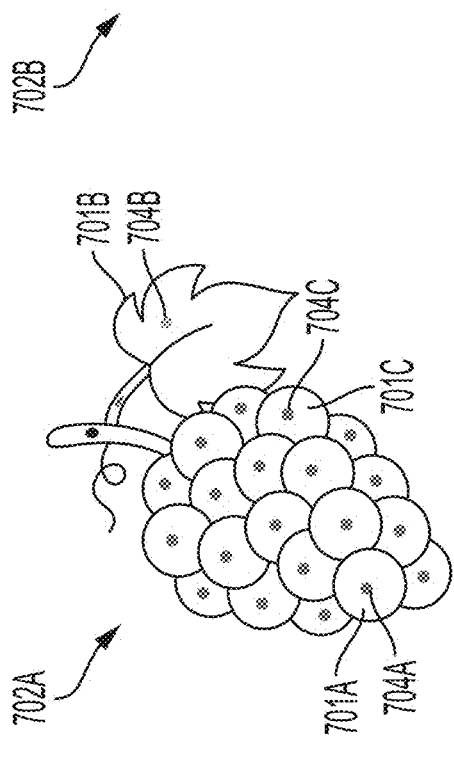
Figure 7C:
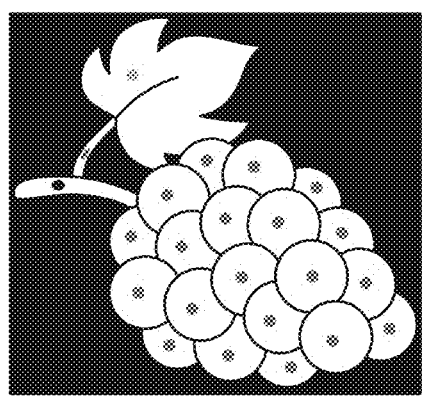

FIG. 7A illustrates an outline image 702A having a plurality of image fields marked as 701A, 701B, 701C and so on. Each image field 701A, 701B and 701C includes a color marking indicated as 704A, 704B, and 704C, respectively. For example, the image field 701A includes the grey color marking 704A and the image field 701B includes the green color marking as 704B, and the image field 701C includes the grey color marking as 704C. For illustration purpose, only three image fields 701A, 701B and 701C are referred but as clearly seen in FIG. 7A, the outline image 702A has more image fields and corresponding color markings. The outline image 702A is processed. During the image processing, a binary image 702B is generated from the outline image 702A as shown in FIG. 7B. The binary image 702B is then converted into a segmented image 702C, indicated in FIG. 7C. Finally, a color filled image 702D is generated as shown in FIG. 7D. The color filled image 702D includes color according to the color markings as initially shown in FIG. 7A. For example, the image field 701B is filled with green color, while the image field 701A is filled with grey color.

Figure 8A:
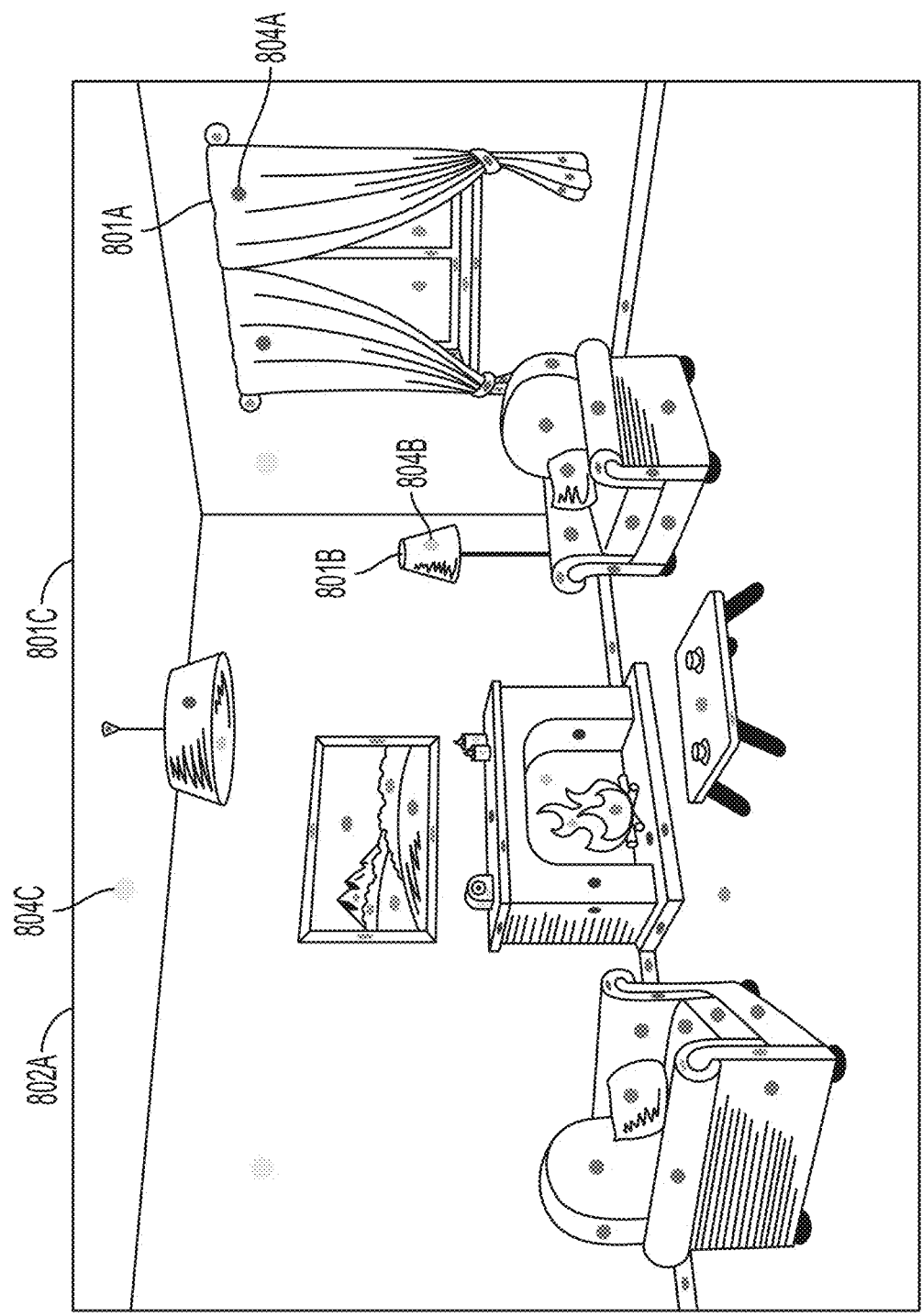
FIGS. 8A-8D illustrate an outline image, intermediate images and color filled image.
Figure 8B:
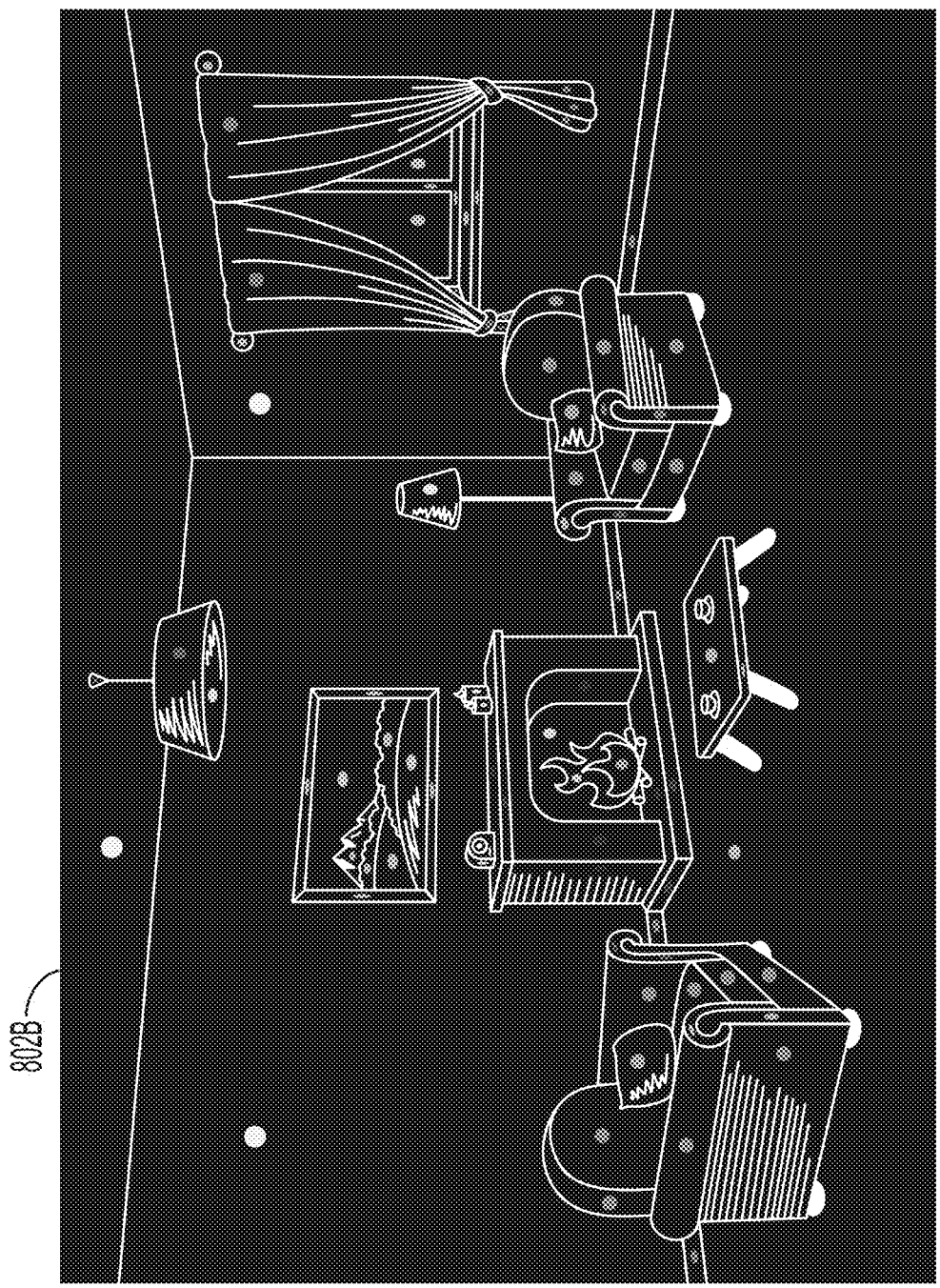
Figure 8C:
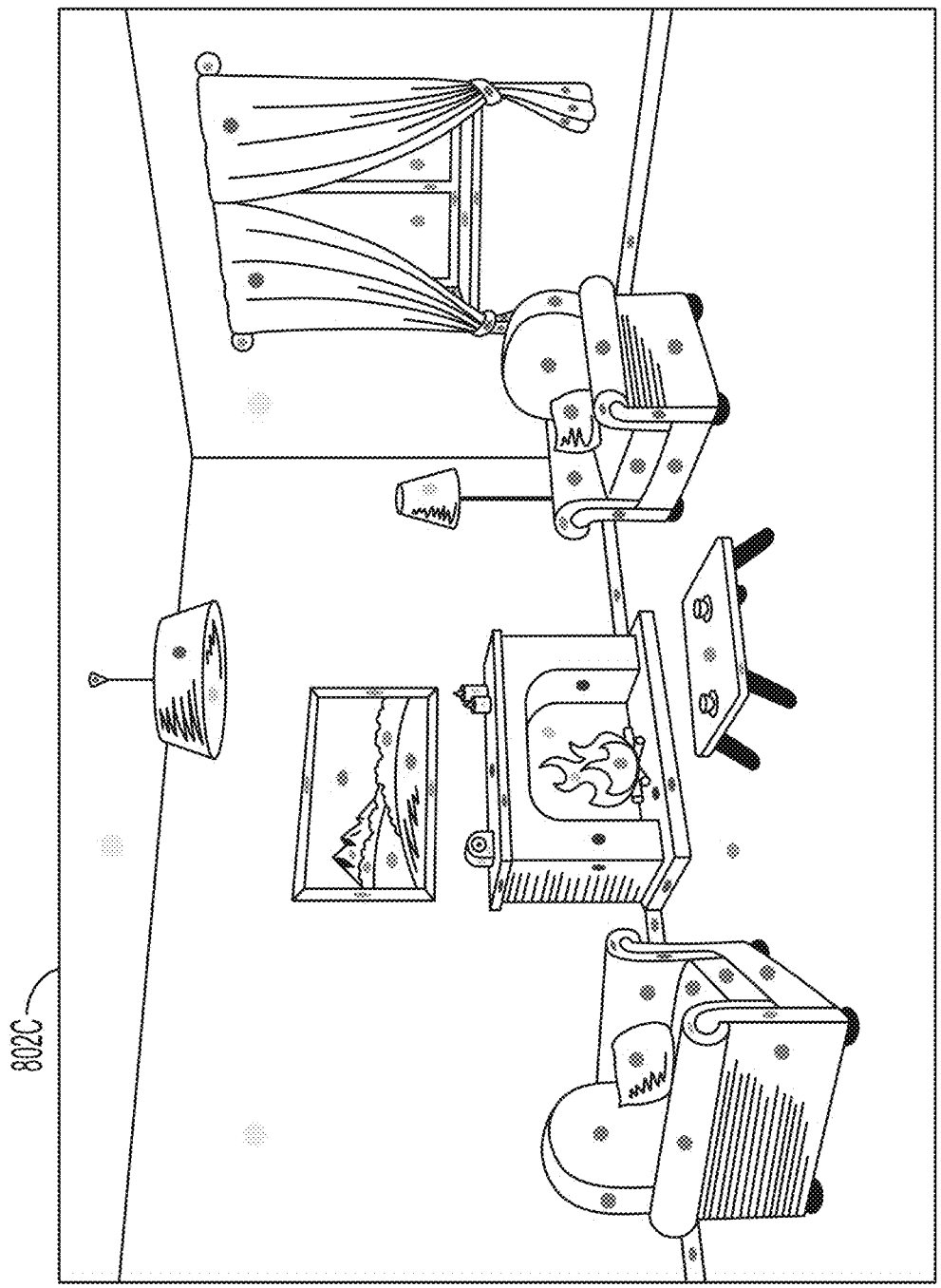
Figure 8D:
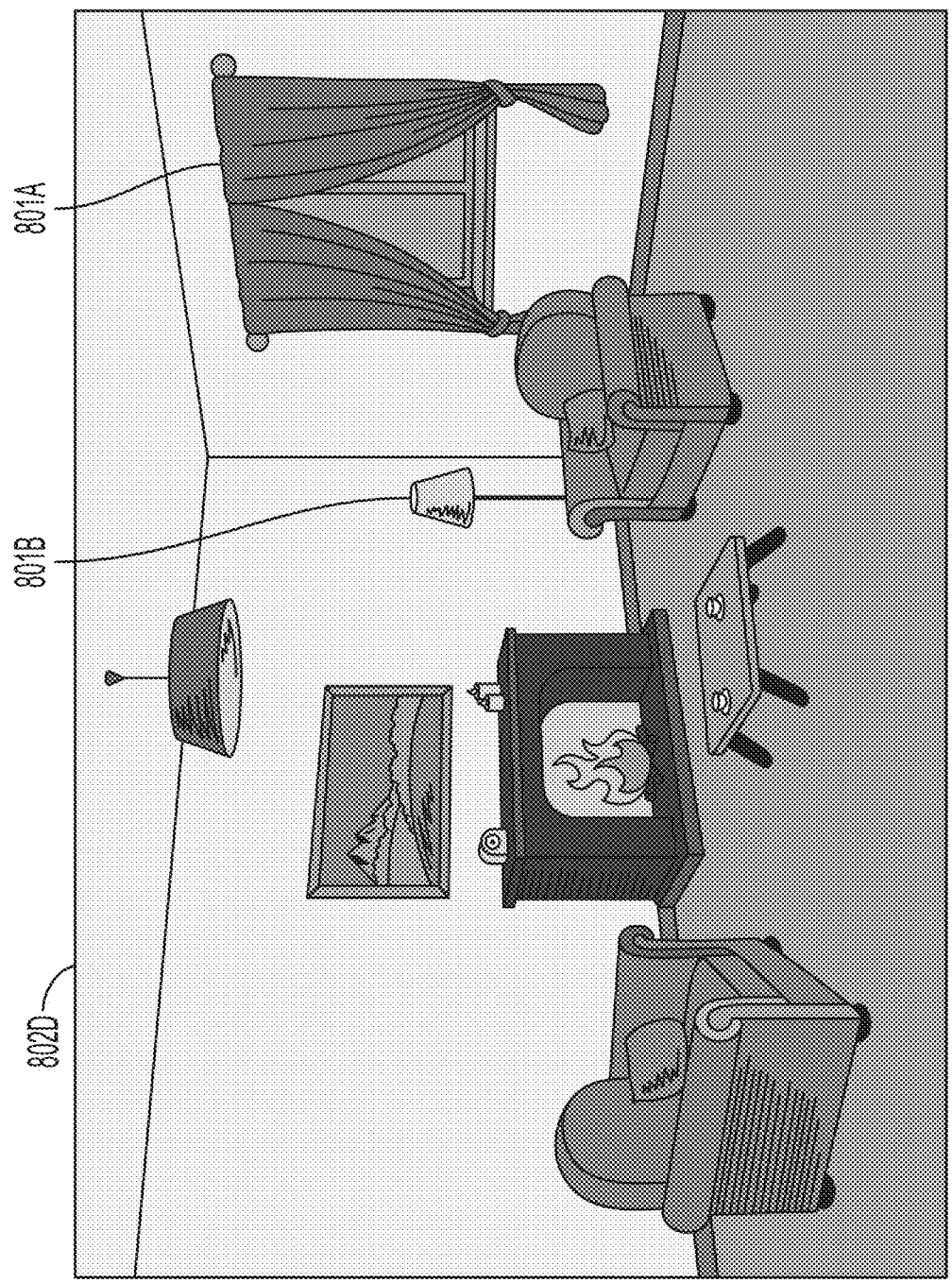

FIG. 8A illustrates an outline image 802A having a plurality of image fields marked as 801A, 801B, 801C and so on. Each image field 801A, 801B and 801C includes color marking as 804A, 804B and 804C, respectively. For example, the image field 801A includes a red color marking 804A, the image field 801B a blue color marking 804B and the image field 801C includes a brown color marking 804C. For example, the image field 801A includes the grey color marking 804A and the image field 801B includes the green color marking as 804B, and the image field 801C includes the grey color marking as 804C. For illustration purpose, only three image fields 801A, 801B and 801C are referred but as clearly seen in FIG. 8A, the outline image 802A has more image fields and corresponding color markings. The outline image 802A is processed. During the image processing, a binary image 802B is generated from the outline image 802A as shown in FIG. 8B. The binary image 802B is then converted into a segmented image 802C, indicated in FIG. 8C. Finally, a color filled image 802D is generated as shown in FIG. 8D. The color filled image 802D includes color according to the color markings as initially shown in FIG. 8A. For example, the image field 801B is filled with blue color, while the image field 801A is filled with red color.

Exemplary Flowchart

Figure 9:
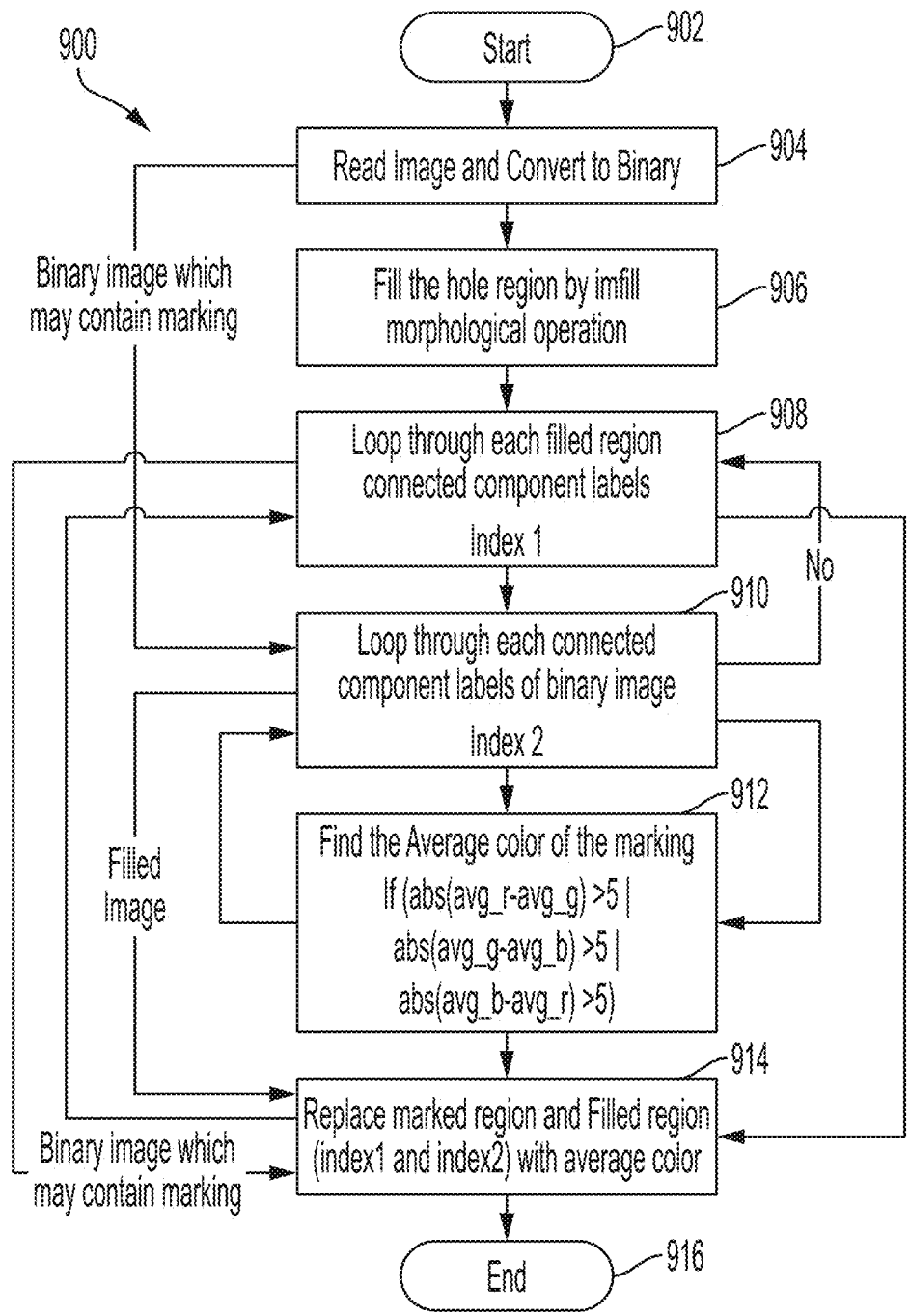
FIG. 9 represents a flowchart illustrating another exemplary method for filling color in at least one outline image at the multi-function device of FIG. 1, in accordance with an embodiment of the present disclosure.

FIG. 9 represents a flowchart illustrating an exemplary method 900 for filling color in at least one outline image at a multi-function device, in accordance with an embodiment of the present disclosure. The method 900 is executed when the present disclosure is implemented in MATLAB, for example. The method 900 is further executed at the multi-function device. The method 900 starts at block 902. The method starts when an outline image is received at the multi-function device. The outline image includes one or more image fields. At block 904, the outline image is read and converted into a binary image. At block 906, a hole region (image field) of the outline image is filled, for example, by using an infill morphological operation. In some embodiments, the image processor 208 fills the hole region. For easy implementation and description purposes only, the morphological operation is used, but a person skilled in the art will understand that any other suitable method can be used.

At block 908, the method loops through each filled region connected components labels and is referred to as index 1. The index 1 being a label of connector component after filling. Then at block 910, the method loops through each connected component labels of binary image and is referred to as index 2. The index 2 being a label of connector component in binary image before filling (or an unfilled image).

At block 912, an average color of the marking is found using following formula:

$$\text{if}(\text{abs}(\text{avg\_}r - \text{avg\_}g) > 5|$$

$$\text{abs}(\text{avg\_}g - \text{avg\_}b) > 5|$$

$$(\text{abs}(\text{avg\_}b - \text{avg\_}r) > 5.$$

The objective of the block 912 is to estimate a color value, find a coefficient, i.e., (R, G, B) from a marked region (i.e., a region in the outline image including the color marking). Then, an absolute difference between each color channel (R, G, B) is estimated. Thereafter, a difference between all channel combinations R-G; G-B; B-A is estimated. The abs represents an absolute difference. While estimating, it is made sure that the absolute difference is above the 't' threshold condition, which means it's a color. It is necessary to avoid filling the region with black color due to some noise in binary image.

$$\text{abs}(\text{avg\_}r - \text{avg\_}g) > t|$$

$$\text{abs}(\text{avg\_}g - \text{avg\_}b) > t|$$

$$\text{abs}(\text{avg\_}b - \text{avg\_}r) > t.$$

If above condition is satisfied, then the corresponding region is filled with estimated average RGB. At block 914, the marked region and filled region (index 1 and index 2) are replaced with the average color to fill the color in the marked region based on the marking. The average color is the marked color. The method 900 ends at block 916.

The present disclosure discloses methods and systems to automate the task of color fill in an outline image. The methods and systems offer a convenient color filling and/or color editing feature directly at a multi-function device. The methods and systems provide users a new way to achieve desired colorization of the outline image. The methods and systems require no third-party tools for filing color in outline images, resulting in cost saving. Moreover, the methods and systems enable users to fill color in outline images without requiring any external computing device like a computer to color fill outline images. The methods and systems further provide an easy and a user-friendly way to fill color in outline images. In all, no third-party tools/software specialist/skilled persons are required to use the present disclosure. The methods and systems save lot of manual human effort, thereby enabling the users to fill the colors without stress. The methods and systems provide an auto recovery feature so that the outline image is never lost and can be reused when required. The paper stock, ink and flattening cost can be saved while implementing the present disclosure. Overall, the methods and systems enhance user satisfaction by providing a number of features as discussed above.

The methods and systems are highly useful for interior designing, artists, fashion designers, architecture designing, logo designing, conceptual designing, students etc. These are just few examples, but the disclosure can be implemented for other industry, domains etc.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, displaying, identifying, scanning, filling, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for filling at least one color in one or more outline images at a multi-function device, comprising:
    providing, at the multi-function device, a user interface for displaying a color fill option, wherein the color fill option comprises an auto fill option and a manual fill option;
    based on receiving a selection of the color fill option, receiving, by the multi-function device, a file comprising at least one outline image, wherein the at least one outline image comprises at least one image field;
    identifying, by the multi-function device, the at least one image field;
    determining whether the at least one image field comprises at least one color marking, wherein the at least one image field comprising the at least one color marking is marked using a particular color;
    upon determining that no color marking is present, receiving a selection of the manual fill option enabling manual selection of at least one color from a display panel of the multi-function device and filling, by the multi-function device, the at least one image field with the at least one color selected by a user;
    upon determining that the image field includes at least one color marking, based on the determination, using the auto fill option and automatically filling, by the multi-function device, the at least one image field of the outline image according to the at least one color marking;
    generating a color filled image from the received outline image after implementing one of the auto fill and manual fill options, wherein the filling of the at least one image field is performed at the multi-function device without requiring an external computing device, and wherein the multi-function device is operative to perform at least printing of the color filled image; and
    displaying a preview of the color filled image on the multi-function device, the preview displayed with an option allowing editing of the colors in the color filled image.

2. The method of claim 1 further comprising receiving, by the multi-function device, the at least one color marking in the at least one image field, directly at the user interface of the multi-function device, when the at least one outline image does not comprise the at least one color marking.

3. The method of claim 1 further comprising receiving, by the multi-function device, the at least one color marking in the at least one image field, through a printed version of the at least one outline image.

4. The method of claim 1 further comprising analyzing, by the multi-function device, the color marked outline image to identify the color and color location in the at least one image field.

5. The method of claim 1 further comprising analyzing, by the multi-function device, the color marked outline image to identify the at least one image field.

6. The method of claim 1 further comprising performing at least one of following based on a user input:
    saving, by the multi-function device, the color filled image in a memory of the multi-function device;
    printing, by the multi-function device, the color filled image on an output medium;
    sending, by the multi-function device, the color filled image to at least one email address via an electronic mail; and
    saving, by the multi-function device, the color filled image in at least one of: a job storage, a public mail box of the multi-function device, a network folder, an external storage device, and a repository.

7. The method of claim 1 further comprising generating, by the multi-function device, an output file comprising the color filled image.

8. The method of claim_1 further comprising displaying, by the multi-function device, a plurality of file options for user selection.

9. The method of claim 1 further comprising displaying, by the multi-function device, the preview of the color filled image for color confirmation by the user.

10. The method of claim 1 further comprising displaying, by the multi-function device, a preview of the at least one outline image for identifying the at least one color marking.

11. A multi-function device, comprising:
    a user interface to display a color fill option, wherein the color fill option comprises an auto fill option and a manual fill option;
    a controller to receive a file comprising at least one outline image having at least one image field, based on receiving a selection of the color fill option; and
    an image processor to:
    identify the at least one image field and whether the at least one image field comprises at least one color marking, wherein the at least one image field comprising the at least one color marking is marked using a particular color;
    upon determining that no color marking is present, receive a selection of the manual fill option enabling manual selection of at least one color from a display panel of the multi-function device and filling, by the multi-function device, the at least one image field with the at least one color selected by a user;
    upon determining that the image field includes the at least one color marking, based on the determination, implement the auto fill option to automatically fill the at least one image field of the outline image according to the at least one color marking;
    generate a color filled image from the received outline image after implementing one of the auto fill and manual fill options, wherein the filling of the at least one image field is performed at the multi-function device without requiring an external computing device, and wherein the multi-function device is operative to perform at least printing of the color filled image; and
    display a preview of the color filled image on the multi-function device, the preview displayed with an option allowing editing of the colors in the color filled image.

12. The multi-function device of claim 11, wherein the controller is to receive the at least one color marking in the at least one image field provided directly at the user interface of the multi-function device, when the at least one outline image does not comprise the at least one color marking.

13. The multi-function device of claim 11, wherein the controller is to receive the at least one color marking in the at least one image field, through a printed version of the outline image.

14. The multi-function device of claim 11, wherein the image processor is to analyze the color marked outline image to identify the color and color location in the at least one image field.

15. The multi-function device of claim 11, wherein the controller is to perform at least one of:
    saving the color filled image in a memory of the multi-function device;
    printing the color filled image on an output medium;

sending the color filled image to at least one email address via an electronic mail; and saving the color filled image in at least one of: a job storage, a public mail box of the multi-function device, a network folder, an external storage device, and a repository.

16. The multi-function device of claim 11, wherein the controller is to display the preview of the color filled image for color confirmation by the user.

17. The multi-function device of claim 11, wherein the controller is to display a preview of the outline image for identifying the at least one color marking.

18. A non-transitory computer-readable medium comprising instructions executable by a processing resource to:

provide, at a multi-function device, a user interface for displaying a color fill option, wherein the color fill option comprises an auto fill option and a manual fill option;

based on receiving a selection of the color fill option, receive a file comprising at least one outline image, wherein the at least one outline image having at least one image field;

identify the at least one image field;

determine whether the at least one image field comprises at least one color marking, wherein the at least one image field comprising the at least one color marking is marked using a particular color;

upon determining that no color marking is present, receive a selection of the manual fill option enabling manual selection of at least one color from a display panel of the multi-function device and filling, by the multi-function device, the at least one image field with the at least on color selected by a user;

upon determining that the image field includes the at least one color marking, based on the determination, implement the auto fill option to automatically fill the at least one image field of the outline image according to the at least one color marking;

generate a color filled image from the outline image after implementing one of the auto fill and manual fill options, wherein the filling of the at least one image field is performed at the multi-function device without requiring an external computing device, and wherein the multi-function device is operative to perform at least printing of the color filled image; and generate a preview of the color filled image for display on the multi-function device, the preview displayed with an option allowing editing of the colors in the color filled image.

19. The non-transitory computer-readable medium of claim 18 comprising instructions executable by the processing resource to display the preview of the color filled image for color confirmation by the user.

20. The non-transitory computer-readable storage medium of claim 18 comprising instructions executable by the processing resource, wherein the application running at the multi-function device displays a preview of the outline image having the one or more image fields.

* * * * *